United States Patent [19]

Kusaka

[11] 4,322,840
[45] Mar. 30, 1982

[54] ARM DRIVING DEVICE IN LINEAR TRACKING PICKUP APPARATUS

[75] Inventor: Satoshi Kusaka, Tokyo, Japan

[73] Assignee: Sony Corporation, Tokyo, Japan

[21] Appl. No.: 159,624

[22] Filed: Jun. 16, 1980

[30] Foreign Application Priority Data

Jun. 22, 1979 [JP] Japan .................................. 54-79348

[51] Int. Cl.³ ......................... G11B 3/38; G11B 21/10
[52] U.S. Cl. ................................................. 369/220
[58] Field of Search ............... 369/219, 220, 221, 222, 369/215, 226

[56] References Cited

U.S. PATENT DOCUMENTS

| | | | |
|---|---|---|---|
| 4,184,688 | 1/1980 | Omura et al. ....................... | 369/226 |
| 4,204,687 | 5/1980 | Inabe et al. ......................... | 369/226 |
| 4,254,959 | 3/1981 | Masterson ........................... | 369/219 |

FOREIGN PATENT DOCUMENTS 55-28548 2/1980 Japan .................................. 369/220

*Primary Examiner*—Steven L. Stephan
*Attorney, Agent, or Firm*—Lewis H. Eslinger; Alvin Sinderbrand

[57] ABSTRACT

Apparatus for controlling a tone arm in a record playing device of the linear tracking pickup type includes a pair of guide rails; a carriage slidably mounted on the guide rails; a pickup assembly mounted on the carriage and including a support mechanism for supporting the tone arm for horizontal movement with respect to a record disc; a linear drive motor for linearly driving the carriage along the guide rails in the horizontal direction with respect to the record disc; a motor drive circuit for controlling the energization of the linear drive motor; an offset angle detecting device for detecting an offset angle of the tone arm and for generating an offset angle output in response thereto; a first switch circuit for supplying the offset angle output to the motor drive circuit when the tone arm traces the record disc to drive the linear drive motor so as to compensate for the detected offset angle; an inclination detecting circuit for detecting an inclination of the carriage with respect to the record disc and for generating an inclination output in response thereto; and a second switch circuit for supplying the inclination output to the motor drive circuit when the tone arm is lifted from the record disc to prevent undesirable linear movement of the carriage.

14 Claims, 20 Drawing Figures

FIG.12
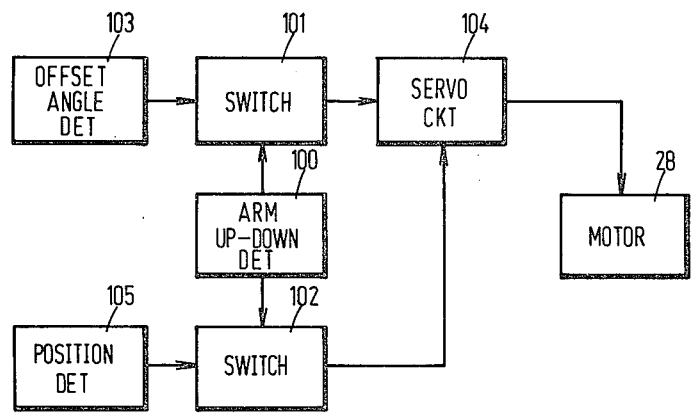
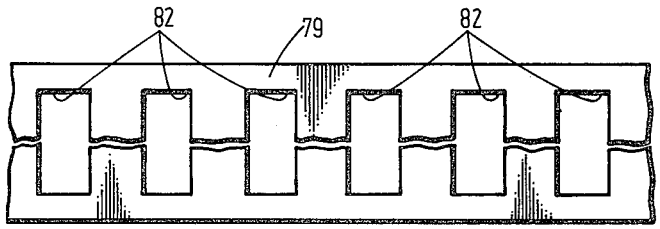
FIG.13A
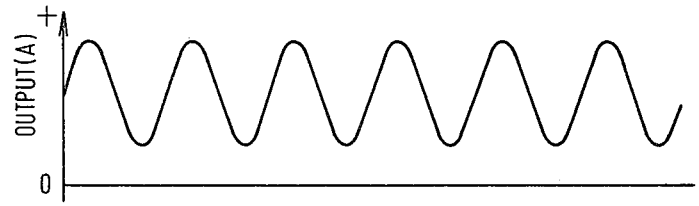
FIG.13B
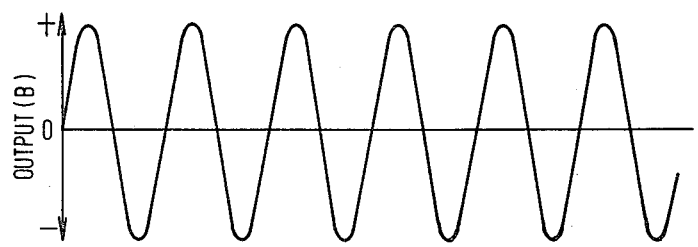
FIG.13C

ARM DRIVING DEVICE IN LINEAR TRACKING PICKUP APPARATUS

BACKGROUND OF THE INVENTION

1. Field of the Invention

The present invention relates generally to a linear tracking pickup apparatus which is used for reproduction of recorded sound or video signals from a phonograph or video disc and, more particularly, is directed to a device for driving a tone arm in such linear tracking pickup apparatus.

2. Brief Description of the Prior Art

In order to completely eliminate lateral tracking error and inside forces in a linear pickup device, there has been proposed and put into practice a so-called linear tracking pickup device.

In some record playing devices of the linear tracking type, a screw feeding mechanism and a wire are used for linearly driving the tone arm. However, since the manufacturing accuracy of the screw feeding mechanism and the wire are not very high, the tone arm is not smoothly moved. On the other hand, a record playing device has been proposed where the tone arm is driven along guide rails by a linear drive motor. However, when electric power is removed from the linear drive motor, the tone arm can be freely moved, since there is no force to hold the arm. Generally, the tone arm is supported by a carriage, and the carriage and tone arm are moved together and constitute a single assembly. The weight of such assembly, however, is considerably large so that when the record playing device is inclined with respect to the horizontal plane, the tone arm and carriage move due to the force of gravity. Further, when the record playing device is supported by flexible support members on a base, the record playing device may be moved to an inclined position as a result of movement of the tone arm and carriage assembly.

Thus, during reproduction of sound from the disc, when the tone arm is unexpectedly moved by vibration of the drive motor or by vibration from an external source, such as the floor, the reproduced output signal is correspondingly modulated, and cross-talk between the right and left channel signals is increased in a stereo reproduction. If the frequency of the vibration is near, or coincides with, the resonant frequency of the tone arm, such cross-talk phenomena is greatly increased.

In the record playing device of the linear tracking type, the tone arm is also moved by the grooves of the record disc, and is angularly displaced in the direction normal to each groove of the disc. Whenever the angular displacement of the arm reaches a predetermined value, the tone arm is driven linearly so as to cancel such angular displacement. Thus, the rotation of the tone arm and linear movement thereof are alternately repeated. The tone arm thus moves linearly, swinging about its axis. However, when the swing movement is too intermittent, signals cannot be reproduced from the disc with good fidelity. It is therefore desirable that the repetition of the rotation-linear movement of the tone arm occurs at very fine and frequent intervals so that the tone arm is smoothly moved across the surface of the record disc.

Further, when a counter-weight is used for adjusting the transducer pressure on the disc, the rotational axis of the tone arm does not coincide with the gravitational center of the arm so that a rotational movement is imparted to the arm during linear movement thereof. As a result, an angular displacement is added to the proper angular displacement thereof whereby linear movement of the arm becomes unstable.

Further, in the record playing device of the linear tracking type, the tone arm is rotatably supported on a carriage which is linearly moved along guide rails. With such arrangement, the rotation of the arm relative to the carriage should be braked, for example, by a motional feedback control, to smoothly and linearly move the arm. Therefore, a rotation detector and a drive motor are provided for the motional feedback control. However, when such elements are mounted on the carriage, a relatively large space is required, in the direction of the length of the rotational axis of the arm, to house such elements, resulting in level adjustment of the tone arm being limited.

SUMMARY OF THE INVENTION

Accordingly, it is an object of the present invention to provide a tone arm driving device for a linear tracking arm apparatus that avoids the above-described difficulties encountered with the prior art.

More particularly, it is an object of this invention to provide a tone arm driving device for a linear tracking arm apparatus for smoothly moving a tone arm on a record disc.

Another object of this invention is to provide an arm driving device for a linear tracking arm apparatus in which the arm is freely moved on a record disc by a linear drive motor, and feedback means is provided for preventing irregular movement of the tone arm.

Still another object of this invention is to provide an arm driving device for a linear tracking arm apparatus in which the arm is driven by a linear drive motor, and means are provided for preventing undesirable movement of the tone arm, even when the record playing device is inclined with respect to the perfect horizontal condition.

Yet another object of this invention is to provide an arm driving device for a linear tracking arm apparatus in which motional feedback means is provided for preventing undesirable vibration of a tone arm during reproduction of sound from the disc.

A further object of this invention is to provide an arm driving device for a linear tracking arm apparatus including a first detecting means for detecting the linear movement of the tone arm driven by a linear drive motor, means for feeding back the output of the detecting means to a drive circuit of the linear drive motor, a second detecting means for detecting any offset angle of the tone arm and second means for feeding the output of the second detecting means to the drive circuit of the linear drive motor, whereby the tone arm is smoothly moved during reproduction from the disc.

A still further object of this invention is to provide an arm driving device for a linear tracking arm apparatus in which small vibrations of the tone arm in the horizontal or vertical direction are detected during the reproduction operation and a detected output is produced which is supplied to a horizontal drive motor or a vertical drive motor, respectively, whereby vibrations in the tone arm are prevented and a reproduced output of high quality is obtained.

A yet further object of this invention is to provide an arm driving device for a linear tracking arm apparatus in which the tone arm is supported by a pair of guide rails through a carriage and a horizontal drive motor and a horizontal rotation detector for the tone arm are positioned between the guide rails, thereby reducing the size of the record playing device.

A further object of this invention is to provide an arm driving device for a linear tracking arm apparatus including a tone arm adapted to move linearly in the horizontal direction by a linear drive motor, first detecting means for detecting any offset angle of the tone arm, a circuit for supplying the output of the first detecting means through a first switch to a drive circuit of the linear drive motor, a detecting circuit for detecting any inclination of the record playing device, and another circuit for supplying the output of the detecting circuit through a second switch to the drive circuit of the linear drive motor, whereby the first switch is closed during the lowering or downward motion of the tone arm and the second switch is closed during the lifting or upward motion of the tone arm so that the tracing quality of the tone arm is improved and undesired vibration of the arm is prevented.

In accordance with an aspect of this invention, an apparatus for controlling a tone arm in a record playing device of the linear tracking pickup type, includes guide means; a carriage slidably mounted on the guide means; a linear drive motor for driving the carriage along the guide means in the horizontal direction with respect to a record disc; a pickup assembly mounted on the carriage and including a supporting mechanism for supporting the tone arm for horizontal movement with respect to the record disc; detecting means for detecting an inclination of the carriage with respect to the record disc and for generating an output in response to such inclination of the carriage; and means for supplying the output to the linear drive motor so as to stop the carriage at a horizontal position with respect to the disc when the tone arm is lifted from the record disc.

The above, and other objects, advantages and features of the present invention will become readily apparent from the ensuing detailed description of illustrative embodiments of the invention which is to be read in connection with the accompanying drawings.

BRIEF DESCRIPTION OF THE DRAWINGS

FIG. 12 is a block diagram of one embodiment of a circuit for preventing free motion of the tone arm of FIG. 1;

FIG. 13A is a plan view of one embodiment of a slit plate that can be used in the mechanism of FIG. 7;

FIG. 13B is a waveform diagram of the output of the light-sensitive element in the mechanism of FIG. 7;

FIG. 13C is a waveform diagram of the output of an operational amplifier supplied with the output of the light-sensitive element, shown in FIG. 13B;

DETAILED DESCRIPTION OF THE PREFERRED EMBODIMENTS

Figure 1:
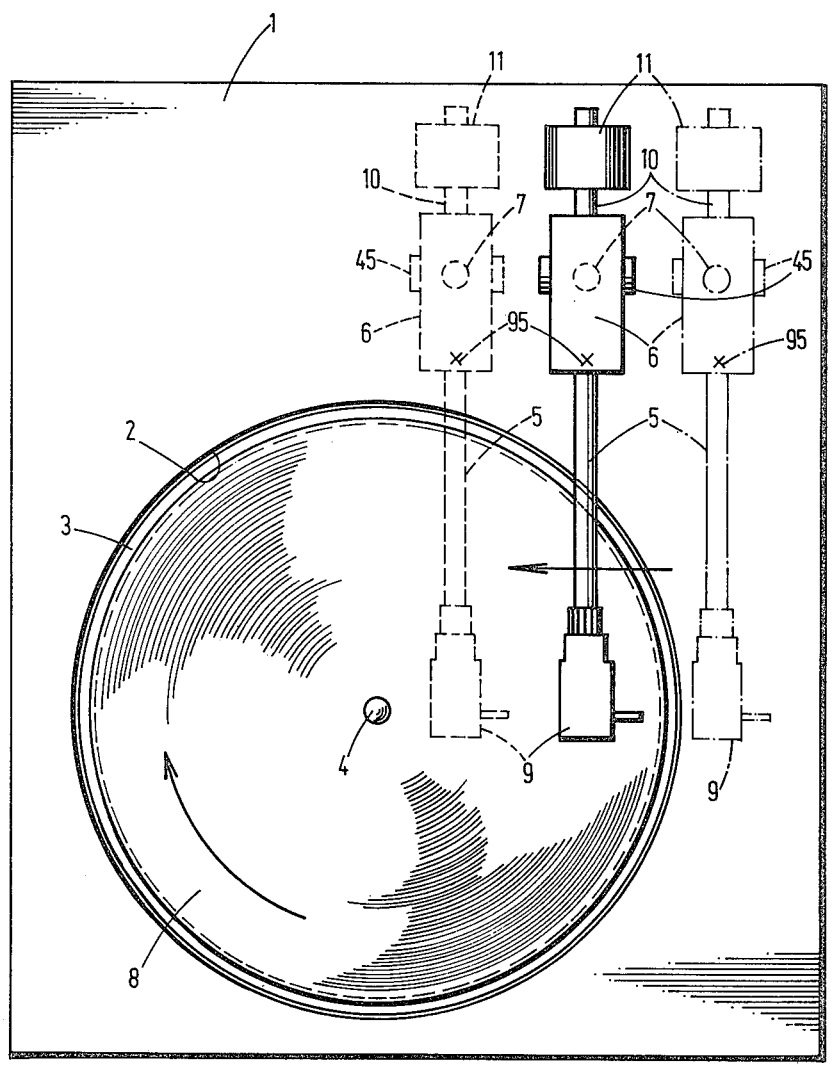
FIG. 1 is a top plan view of a recording playing device provided with a linear tracking pickup apparatus according to one embodiment of this invention.

Referring to the drawings, and initially to FIG. 1 thereof, there is shown a record playing device having a linear tracking pickup apparatus according to one embodiment of this invention. The recording playing device includes a large circular opening 2 in an upper plate 1 of the cabinet of the device, and a turntable 3 is arranged in the opening 2 and is rotatably supported by a spindle 4 therein. A tone arm 5 is fixed to a parallelepiped or rectangularly-shaped casing 6 so as to be disposed above plate 1 of the cabinet and the latter casing 6 is mounted on a horizontal drive shaft 7 which is adapted to move in the left or right directions of FIG. 1. Accordingly, as a result of such movement of drive shaft 7, tone arm 5 is maintained in a substantially tangential direction in regard to the sound grooves of a record disc 8 supported by turntable 3. It should thus be appreciated that a transducer 9 fixed to the free end of tone arm 5 linearly tracks the sound grooves of record disc 8. A rear arm 10 which is aligned with tone arm 5 and which is fixed to the back wall of casing 6 has a counter weight 11 fixed thereto.

Figure 2:
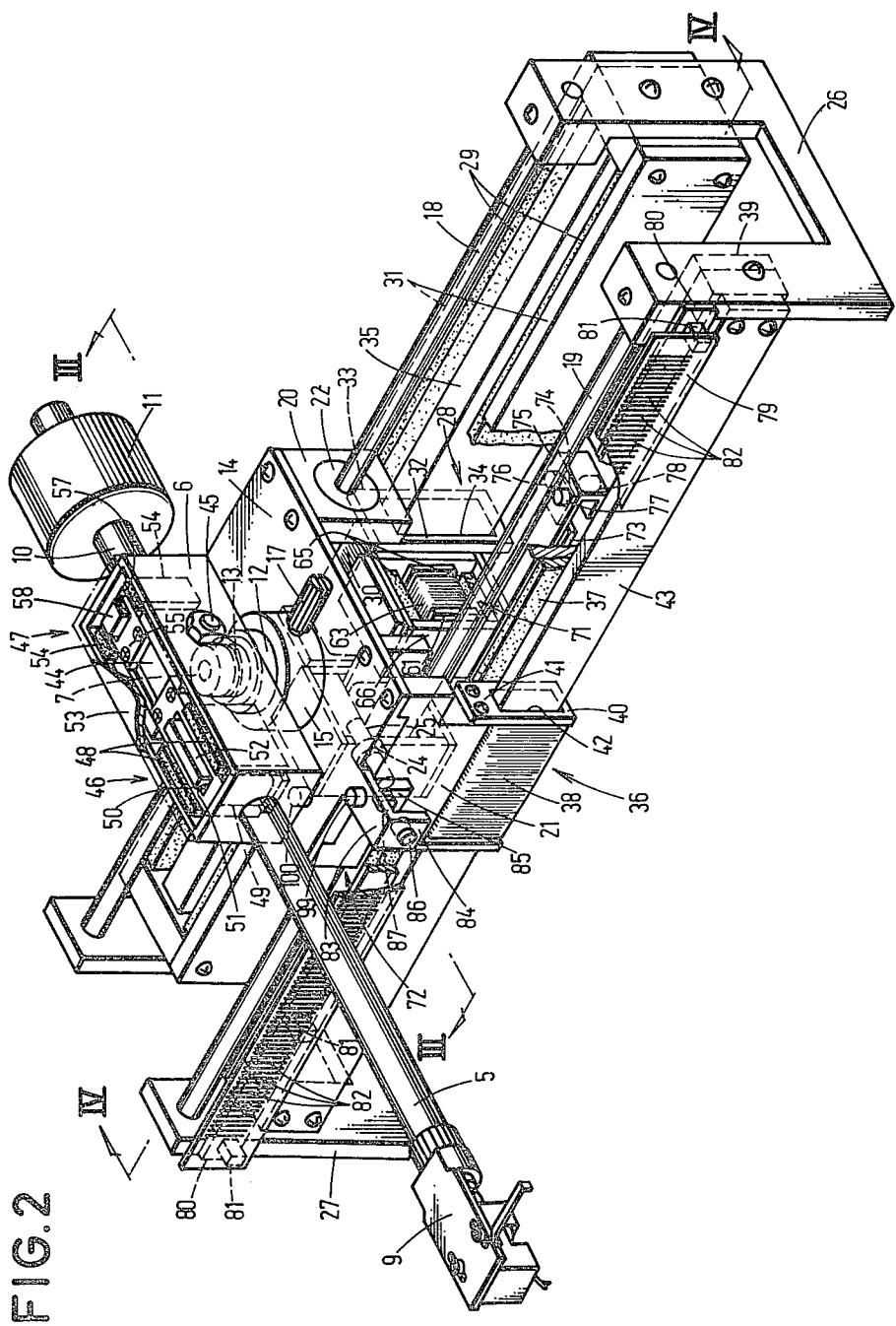
FIG. 2 is a perspective view of a tone arm driving device in the linear tracking pickup apparatus of FIG. 1.
Figure 3:
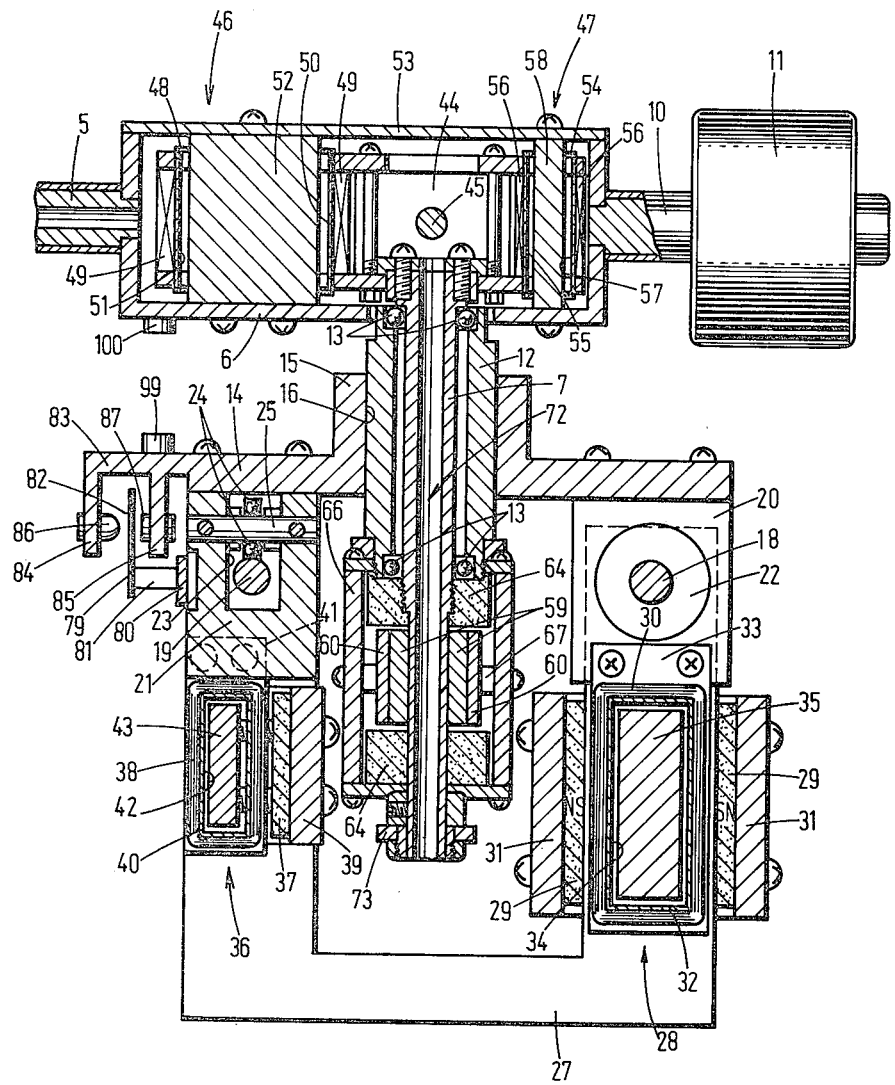
FIG. 3 is an enlarged cross-sectional view of the arm driving device of FIG. 2, taken along line III—III thereof.
Figure 4:
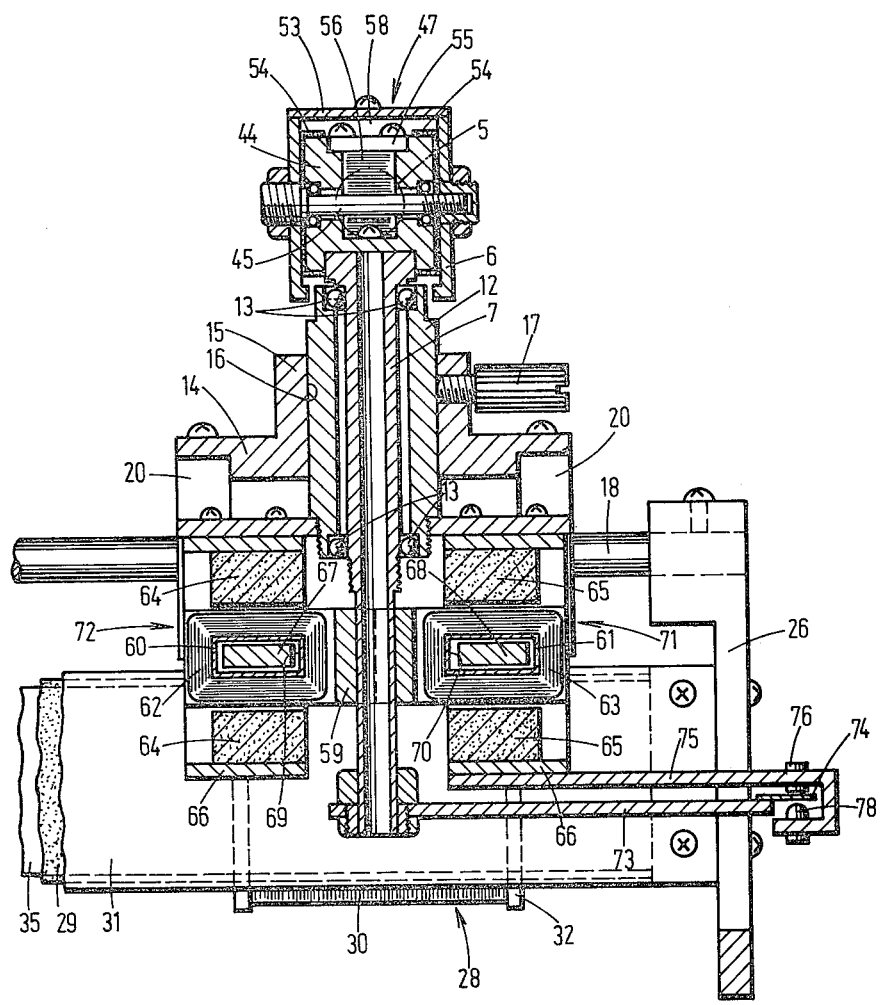
FIG. 4 is an enlarged cross-sectional view of the arm driving device of FIG. 2, taken along line IV—IV thereof.

Referring now to FIGS. 2-4, a mechanism for linearly driving tone arm 5 in the horizontal direction will now be discussed.

As shown therein, horizontal drive shaft 7 is vertically inserted through a sleeve 12, as shown in FIG. 3, and is rotatably supported therein by a pair of bearings 13 arranged at the upper and lower ends of sleeve 12. Sleeve 12, in turn, passes through a piercing hole 16 of a boss portion 15 of a carriage 14 and is fixed to boss portion 15 by a fastening screw 17 which is screw-threadedly received in boss portion 15, as shown in FIG. 4. Thus, when screw 17 is loosened or unscrewed so as to disengage sleeve 12, sleeve 12 is free to move in the vertical direction of FIGS. 3 and 4, whereby the vertical level of tone arm 5 above the record disc surface can be adjusted.

The carriage 14 supporting horizontal drive shaft 7 is, in turn, supported by a pair of guide rails 18 and 19 so as to be slidable along the latter. In particular, a pair of support plates 20 and a support block 21 are fixed on the lower surface of carriage 14 with the support plates 20 being separated from each other in the lengthwise direction of guide rail 18. Slide bearings 22 are fixed within each of support plates 20 and guide rail 18 is disposed within slide bearings 22. In like manner, a U-shaped recess 23 is formed in support block 21 whereby guide rail 19 passes through recess 23. A roller 24, which is supported by a support pin 25 which, in turn, is secured to support block 21, contacts guide rail 19 whereby the latter guide rail 19 is slidable in the longitudinal direction thereof. Thus, carriage 14 is supported on three points on guide rails 18 and 19 through the pair of slide bearings 22 and roller 24, respectively. Further, guide rails 18 and 19 are supported at their ends by U-shaped holding members 26 and 27, as shown in FIG. 2.

Positioned under guide rail 18 and arranged in a parallel relationship thereto, as shown in FIG. 3, is a linear drive motor 28 comprised of a pair of parallel permanent magnets 29 and a drive coil 30 which forms a magnetic circuit with permanent magnets 29. The latter permanent magnets 29 are fixed to longitudinal mounting plates 31 which, in turn, are secured to holding members 26 and 27, and mounting plates 31 are magnetically coupled with permanent magnets 29 and function as a yoke assembly. Drive coil 30 is wound about a bobbin 32 having upward projections 33 that are fixed to support plates 20. A yoke assembly 35 passes through a central opening 34 of bobbin 32 and is supported at its ends by holding plates 26 and 27. The aforementioned magnetic circuit is further comprised by mounting plates 31 and yoke assembly 35. When a current flows through coil 30, a resultant force is applied to drive coil 30, urging it in lengthwise direction of guide rail 18. The force is transmitted through the projections 33 of bobbin 32 and through support plates 20 so as to drive carriage 14 in the lengthwise direction along guide rails 18 and 19.

Positioned under guide rail 19 and arranged in a parallel relationship thereto is a linear motion or velocity detector 36 comprised of a single permanent magnet 37, a mounting plate 39 functioning as a yoke and a yoke assembly 43 magnetically coupled with permanent magnet 37 so as to form a magnetic circuit, and a coil 38 arranged in the magnetic circuit. Permanent magnet 37 is supported by mounting plate 39 which, in turn, is supported by holding members 26 and 27 (refer to FIG. 2). Coil 38 is wound on a bobbin 40, as shown in FIG. 3 and upward projection 41 formed on bobbin 40 is fixed to supporting block 21. The yoke assembly 43 passes through a central opening of bobbin 40 and is supported at its ends by holding members 26 and 27. Thus, coil 38 moves in the lengthwise direction of guide rail 19, along with carriage 14, whereby magnetic flux from magnet 37 interlinks with moving coil 38 to produce a current flow through coil 38.

It should be appreciated that linear drive motor 28 and linear motion detector 36 are separated from each other under guide rails 18 and 19 so that leakage flux from linear drive motor 28 has no effect on linear motion detector 36. In like manner, noise from linear drive motor 28 is not sensed by detector 36. However, as described hereinafter, motional feedback is effected by the detector 36 whereby tone arm 5 can be smoothly moved in the horizontal direction. For the present discussion, the "horizontal direction" means a direction parallel to the surface of record disc 8 with which the illustrated record playing device is used, and the expression "vertical direction" is perpendicular to this horizontal direction.

A mechanism for vertically driving tone arm 5 and a vertical motion detector will now be discussed in regard to FIGS. 2-4.

Referring first to FIG. 4, it is seen that the upper end of horizontal drive shaft 7 is fixed to the bottom of a U-shaped connecting member 44 and a horizontally arranged shaft 45 is mounted on connecting member 44 with both ends thereof passing through the side walls of the casing 6. Tone arm 5 is vertically driven about shaft 45 whereby casing 6 and tone arm 5 fixed thereto are rotatably supported by horizontal drive shaft 7 by means of shaft 45. Thus, tone arm 5 is adapted for rotatable movement about shaft 45 so as to be lowered into contact with or raised from record disc 8.

As shown in FIG. 3, a vertical drive motor 46 and a vertical motion detector 47 are arranged within casing 6 with vertical drive motor 46 being arranged at the tone arm side of casing 6. Vertical drive motor 46 is comprised of a magnetic circuit including a pair of permanent magnets 48 (FIG. 2), a portion of casing 6 and a yoke assembly 52 magnetically coupled with permanent magnets 48, and a coil 49 arranged in the magnetic circuit. In particular, the pair of magnets 48 are fixed to the side walls of casing 6, whereby casing 6 functions as yoke. Further, coil 49 is wound on a square bobbin 50 which is fixed to connecting member 44 and yoke assembly 52 passes through a central opening 51 of bobbin 50 and is fixed to casing 6. The upper end of yoke assembly 52 contacts a cover 53 of casing 6.

Vertical motion or velocity detector 47 is constructed in a similar manner to vertical drive motor 46 and includes a magnetic circuit comprised of a pair of permanent magnets 54, a portion of casing 6 and a yoke assembly 58 magnetically coupled with permanent magnets 54, and a coil 56 arranged in the magnetic circuit. In particular, permanent magnets 54 are fixed to the opposite side walls of casing 6 and coil 56 is wound on a bobbin 55 positioned between magnets 54. Bobbin 55 is fixed to connecting member 44 and yoke assembly 58 passes through a central opening 57 of bobbin 55 and is fixed to casing 6. The upper end of yoke assembly 58 contacts cover 53. Thus, when a current flows through coil 49, a resultant force is applied to magnets 48 so as to rotate casing 6 and tone arm 5 vertically about horizontal shaft 45. Consequently, a current flows through coil 56 of detector 47 in accordance with the vertical rotation or vertical vibration of tone arm 5, whereby such vertical motion of tone arm 5 is detected by detector 47, the latter producing a detected output in response thereto. When such detected output from detector 47 is fed back to vertical drive motor 46, unwanted vibrations in tone arm 5 during its lowering and raising motions and during reproduction, are prevented.

Referring now to FIG. 4, a horizontal drive motor and a horizontal motion or velocity detector, which are both positioned at the lower end of horizontal drive shaft 7, will now be discussed.

As shown in FIG. 4, a connecting plate 59 is fixed to horizontal drive shaft 7 near the lower end thereof and bobbins 60 and 61 are fixed to connecting plate 59 at opposite sides thereof. A pair of coils 62 and 63 are wound on bobbins 60 and 61, respectively. A pair of permanent magnets 64 are respectively positioned above and below coil 62 and a pair of permanent magnets 65 are respectively positioned above and below coil 63. Permanent magnets 64 and 65 are fixed to the inner walls of a casing 66 which is fixed to sleeve 12 and which functions as yoke assembly. Further, bobbins 60 and 61 include central openings 69 and 70, respectively, through which yoke assemblies 67 and 68 pass, the latter yoke assemblies being fixed to the side walls of casing 66.

A horizontal drive motor 71 is provided which includes a magnetic circuit comprised of permanent magnets 65 and yoke assemblies 66 and 68, and coil 63 which is arranged within the magnetic circuit. In like manner, a horizontal motion detector 72 also includes a magnetic circuit comprised of permanent magnets 64 and yoke assemblies 66 and 67, and coil 62 which is arranged within the magnetic circuit. Thus, when tone arm 5 vibrates in the horizontal direction during the reproduction operation with respect to the record disc, coil 62 which is wound about bobbin 60 rotates about horizontal drive shaft 7. Since coil 62 is positioned between magnets 64, a current flows through coil 62 whereby such horizontal vibration of tone arm 5 is detected by horizontal motion detector 72 and a corresponding detected output is produced. The detected output from horizontal motion detector 72 is fed back to coil 63 of horizontal drive motor 71 so as to produce a current flow through coil 63. Consequently, a force for opposing the force of vibration is imparted to bobbin 61 on which coil 63 is wound, and such force is transmitted through connecting plate 59 and horizontal drive shaft 7 to arm 5 to cancel the horizontal vibration of tone arm 5.

Horizontal drive motor 71 and horizontal motion or velocity detector 72 are positioned between linear drive motor 28 and linear motion detector 36. It should thus be appreciated that additional space is not required for horizontal drive motor 71 and horizontal motion detector 72. Thus, the vertical level of tone arm 5 can be adjusted over a considerable extent. In other words, by loosening fastening screw 17, casing 66 containing motor 71 and detector 72 can be moved with sleeve 12 in the vertical direction between guide rails 18 and 19.

The center of gravity of the parts fixed to carriage 14 is positioned midway between guide rails 18 and 19, and within a triangle formed at three points by the connection of carriage 14 to guide rails 18 and 19 by means of slide bearings 22 (FIG. 3) and roller 24. It should thus be appreciated that, as a result of the positioning of the center of gravity, carriage 14 can be smoothly moved in the horizontal direction along guide rails 18 and 19 without any undesired force being applied to guide rails 18 and 19.

Figure 5:
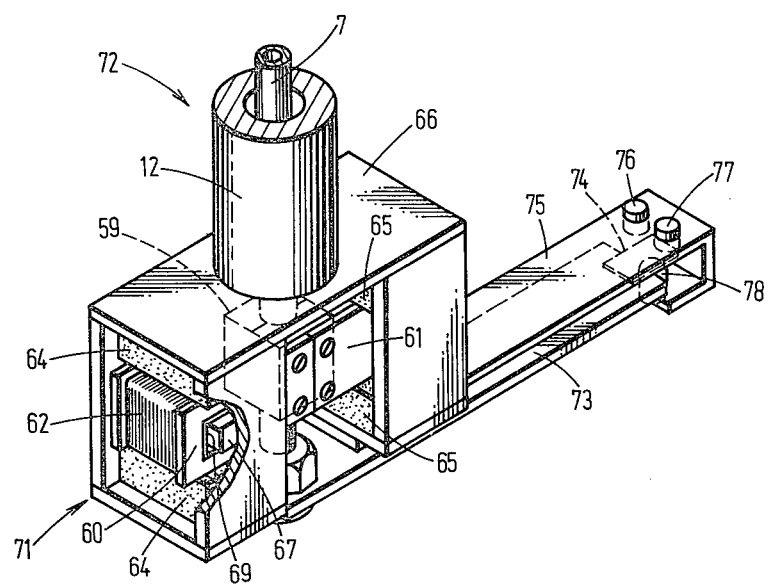
FIG. 5 is an enlarged perspective view of one embodiment of an arm offset angle detector used in the linear tracking pickup apparatus of FIG. 1.
Figure 6:
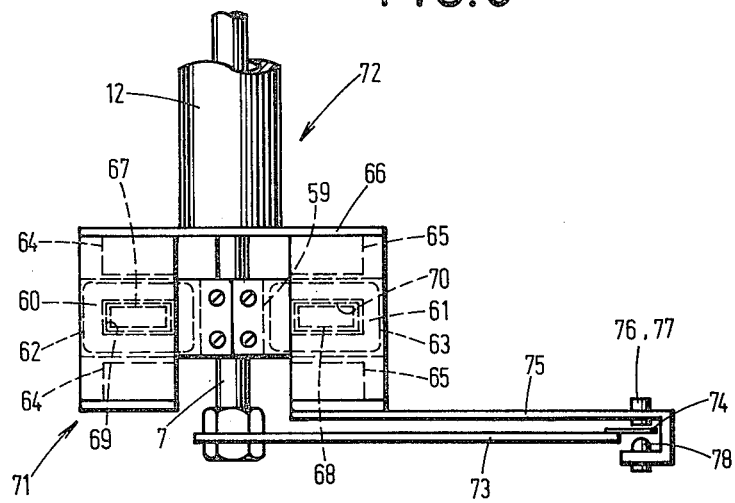
FIG. 6 is a side plan view of the detector of FIG. 5.

Referring now to FIGS. 4-6, an offset angle detecting apparatus will now be discussed.

As shown therein, a holding plate 73 is fixed to the lower end of horizontal drive shaft 7 and a shutter 74 is fixed to the free end of holding plate 73. Another holding plate 75 is fixed to the bottom of casing 66 and the free end of holding plate 75 is bent in a U-shaped manner about shutter 74. A pair of light-sensitive elements 76 and 77 are fixed to the upper portion or leg of the U-shaped end of holding plate 75 and a light-emitting element 78 is fixed to the lower portion or leg of the U-shaped end of holding plate 75 with shutter 74 being arranged between the pair of light-sensitive elements 76 and 77, and the light-emitting element 78. Upon rotation of horizontal drive shaft 7, shutter 74 also rotates and thus moves relative to light-emitting element 78 and light-sensitive elements 76 and 77 to vary the amount of light received by light-sensitive elements 76 and 77. As a result, there occurs a consequent detection of the offset angle of horizontal drive shaft 7.

Figure 7:
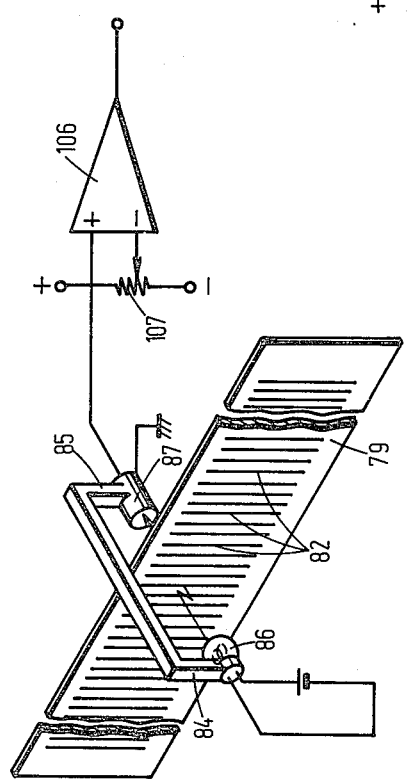
FIG. 7 is a part perspective view, part circuit diagram of one embodiment of a portion of a mechanism for detecting any free linear motion of the carriage in the apparatus of FIG. 1.

Referring back to FIGS. 1 and 3, a mechanism for detecting any movement of carriage 14 due to gravity from an inclination of the record playing device is shown. As shown therein, a slit plate 79, which is arranged in parallel with guide rail 19, is fixed at both ends thereof to a frame 80 by means of arms 81, the frame 80, in turn, being held by holding members 26 and 27. Slit plate 79 is made of an opaque material and has numerous slits 82 formed at regular intervals therein (FIG. 7). An outwardly extending side arm 83 is formed integrally with carriage 14, as shown in FIG. 3 and includes a pair of downwardly extending projections 84 and 85 formed on side arm 83. A light-emitting element 86 is fixed on one downwardly extending projection 84 and a light-sensitive element 87 is fixed on the other downwardly extending projection 85 with slit plate 79 being arranged between light-emitting element 86 and light-sensitive element 87. Accordingly, when carriage 14 moves along guide rails 18 and 19 due to the effect of gravity, light-emitting element 86 and light-sensitive element 87 move relate to slit plate 79 whereby a sinusoidal output is generated from light-sensitive element 87 in response to such movement.

In operation, at the start of the automatic play operation, tone arm 5 is at its rest position, shown by the dot-dash line in FIG. 1. At this time, linear drive motor 28 is energized by an operating member (not shown) or by an instruction from a system controller (not shown) whereby tone arm 5 linearly moves in the leftward direction, as shown by the arrow over tone arm 5 in FIG. 1.

Referring now to FIGS. 2 and 3, a current is supplied to coil 30 in response to such energization and a drive force is imparted to linear drive motor 28. Thus, carriage 14 moves along guide rails 18 and 19 and, since tone arm 5 is supported by carriage 14 through casing 6, horizontal drive shaft 7 and sleeve 12, tone arm 5 is also linearly moved in a direction normal to the lengthwise direction of tone arm 5, that is, along guide rails 18 and 19.

Figure 8:
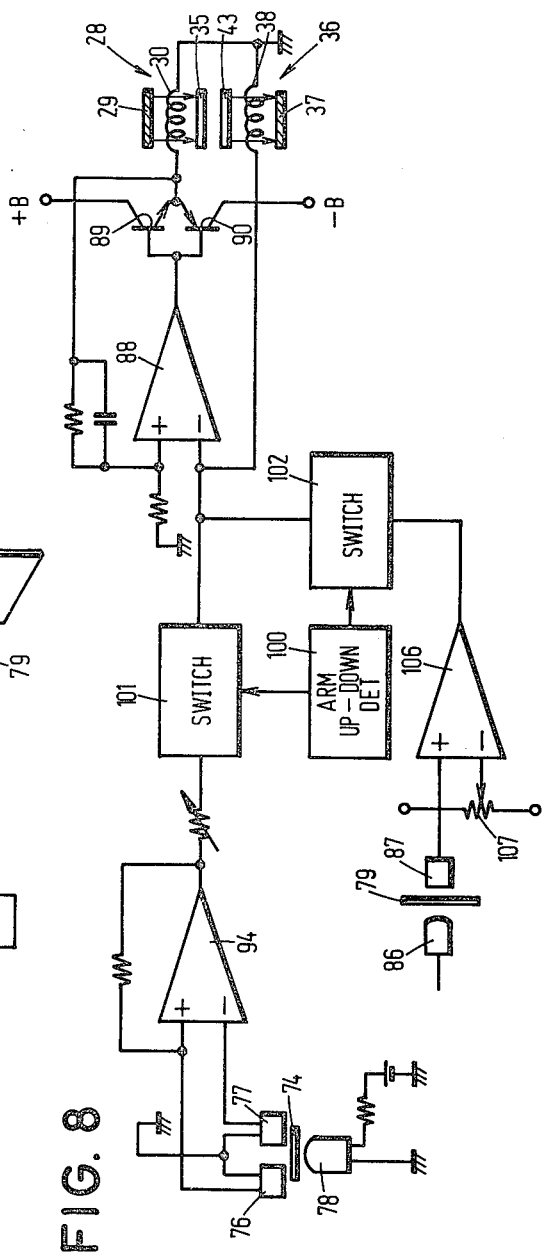
FIG. 8 is a block, circuit wiring diagram of a linear drive motional feedback circuit for the tone arm of FIG. 1.

The motional feedback control is effected for linear drive motor 28 by means of linear motion detector 36 (refer to FIG. 2 and FIG. 3) whereby tone arm 5 is smoothly moved in the aforementioned linear direction. In particular, as shown in FIG. 8, the detected output voltage from coil 38 of linear motion detector 36 is supplied to the inverting input of an operational amplifier 88 and a voltage applied to coil 30 of linear drive motor 28 is fed back to the non-inverting input of operational amplifier 88. With the two voltages being compared with each other in operational amplifier 88. The output of operational amplifier 88 is connected to the bases of two transistors 89 and 90. Transistor 89 is an NPN transistor having its collector connected to a voltage source +B and transistor 90 is a PNP transistor having its collector connected to a voltage source −B, and the emitters of the two transistors are connected in common to coil 30 and the non-inverting input of operational amplifier 88. The impedances of transistors 89 and 90 vary with the level of the output from operational amplifier 88 whereby to change the current flowing through drive coil 30.

Thus, when the impedance of transistor 89 is of a low value, the amount of current flowing through drive coil 30 is large so that tone arm 5 is moved at a high speed. However, in such a case, tone arm 5 has a tendency to overrun a desired position on disc 8 and it is difficult to stop tone arm 5 at this desired position. According to one embodiment of this invention, the output of coil 38 is supplied to the inverting input of operational amplifier 88, as previously described. However, the output of coil 38 depends on the linear speed of tone arm 5 and carriage 14. Accordingly, the impedance of transistor 89 increases with the speed of tone arm 5 so that the current flowing through coil 30 is correspondingly impeded. Thus, tone arm 5 is moved to the desired position on disc 8 from the rest or starting position on disc 8 at a predetermined speed.

In the lead-in operation in which tone arm 5 is led to a record position on disc 8 from the rest position, and in the lead-out position in which tone arm 5 is led to the rest position from a record position on disc 8, a bias voltage for controlling the conduction of transistors 89 and 90, although not shown, is supplied to an input of operational amplifier 88.

A record size detector detects the size of disc 8 so that transducer 9 which is carried by tone arm 5 reaches the outermost recorded groove on record disc 8 for start of the lead-in operation. At this time, the DC bias voltage is cut off from operational amplifier 88 to stop the linear drive motor 28 from further moving tone arm 5. Although not shown, tone arm 5 is then moved down by instruction of the system controller whereby a current flows through coil 49 of vertical drive motor 46, as shown in FIGS. 2 and 3. Vertical drive motor 46 thus rotates casing 6, which supports magnets 48 and yoke assembly 52, about horizontal shaft 45 in the counter-clockwise direction, as viewed in FIG. 3. Thus, tone arm 5 is also rotated in the counter-clockwise direction whereby transducer 9 is placed into contact with record disc 8 for reproducing sound therefrom.

Figure 9:
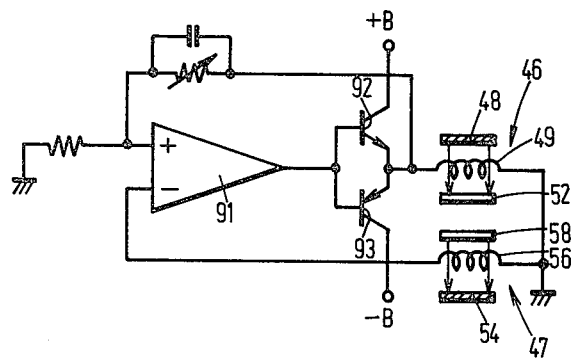
FIG. 9 is a block, circuit wiring diagram of a motional feedback circuit for the vertical rotation of the tone arm of FIG. 1.

During such vertical rotation of tone arm 5, a motional feedback control is imparted to vertical drive motor 46 by means of vertical rotation detector 47. Thus, the arm 5 can be very smoothly rotated in the vertical direction. The circuit of FIG. 9 is constructed in a similar manner to the drive circuit of linear motor 28, shown in FIG. 8. In particular, the circuit of FIG. 9 includes an operational amplifier 91 for comparing the voltage applied to coil 49 of vertical drive motor 46 with the output voltage of detecting coil 56 of detector 47. The output of operational amplifier 91 is connected to the bases of two transistors 92 and 93. Transistor 92 is an NPN transistor having its collector connected to a voltage source +B and transistor 93 is a PNP transistor having its collector connected to a voltage source −B and the emitters of the two transistors are connected in common to coil 49 and the non-inverting input of amplifier 91. The impedances of transistors 92 and 93 vary with the output of operational amplifier 91. Thus, when tone arm 5 is driven downwards and upwards at the start of the record play and the end of the latter, respectively, a DC bias voltage (not shown) selectively activates transistors 93 and 93 into their conductive state and non-conductive state, respectively, the DC bias voltage being supplied to an input of operational amplifier 91.

Conventionally, a sound groove is spirally formed on record disc 8. Thus, during the reproducing operation, transducer 9, which is fixed to tone 5, gradually moved towards the center of record disc 8 during rotation of record disc 8. Tone arm 5 is gradually rotated in the clockwise direction, as viewed in FIG. 1, about horizontal drive shaft 7 at such a time. Accordingly, holding plate 73, which is connected to tone arm 5 through casing 6 and horizontal drive shaft 7, is gradually rotated in the same clockwise direction. Consequently, shutter 74, which is fixed to the free end of holding plate 73, is also moved in the clockwise direction of record disc 8 so as to be displaced relative to light-emitting element 78 and light-sensitive elements 76 and 77. The amount of light received by the two light-sensitive elements 76 and 77 is thus different and such difference is detected by an operational amplifier 94, as shown in FIG. 8. The output of operational amplifier 94 is supplied through a switch circuit 101 to the inverting input of operational amplifier 88. Accordingly, the impedance of transistor 89 is lowered by the output from operational amplifier 88 whereby current flows through coil 30 of linear drive motor 28. Thus, linear drive motor 28 moves tone arm 5 towards the center of record disc 8 by means of carriage 14.

In the record playing device according to an embodiment of this invention, tone arm 5 is angularly displaced during rotation of record disc 8. Such angular displacement or offset angle of tone arm 5 is detected by light-sensitive elements 76 and 77 whereby linear motor 28 moves carriage 14 in response to such detection so as to cancel the offset angle of tone arm 5. Thus, tone arm 5 moves linearly and also rotates about horizontal drive shaft 7 to cancel any offset angle.

In particular, the bias voltage corresponding to the offset angle of tone arm 5 is supplied to the inverting input of operational amplifier 88 of the drive circuit for linear drive motor 28, where it is added to the detected output of coil 38. Thus, linear drive motor 28 is driven so as to cancel any offset angle of tone arm 5 and is further controlled by the motional feedback control in response to detection by coil 38. It should be appreciated that the offset angle error is small so that tone arm 5 can be finely, smoothly and linearly moved, finely swinging about horizontal drive shaft 7. Further, the circuit for cancelling the offset angle of tone arm 5 and the drive circuit for linear drive motor 28 have many common elements so that the circuit construction is simplified.

The motional feedback control is effected also for horizontal rotation of tone arm 5 by horizontal drive motor 71 and horizontal motion detector 72 (FIG. 4) to prevent tone arm 5 from vibrating in the horizontal direction.

Generally, no braking means is provided in the tone arm so that any braking action only results from friction due to the bearings of the tone arm. Accordingly, the tone arm has a tendency to resonate or to vibrate by the action of an external force, although such latter vibration is small. However, when tone arm 5 vibrates in the horizontal direction, there is increased cross-talk between the right and left channel signals during stereo reproduction and/or modulation of the reproduced output occurs. Referring back to FIG. 1, it is seen that the center of gravity of tone arm 5 is positioned in front of vertical drive shaft 7, as represented by reference numeral 95. Accordingly, when tone arm 5 is moved in the horizontal direction, a force is applied to tone arm 5 to rotate it about the center of gravity 95 whereby a component different than the actual offset angle is detected which would normally render the horizontal drive of tone arm 5 unstable.

Figure 10:
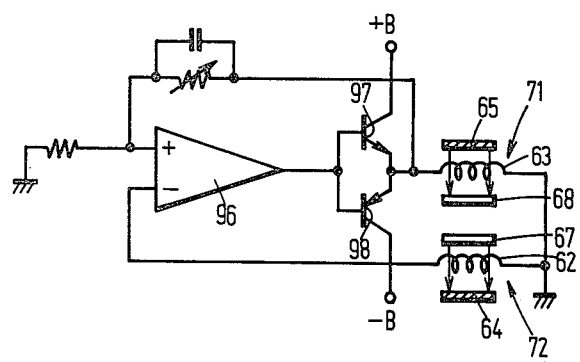
FIG. 10 is a block, circuit wiring diagram of a motional feedback circuit for the horizontal rotation of the tone arm of FIG. 1.

However, according to the present invention, the detected output of coil 62 of horizontal motion detector 72 and the voltage applied to coil 63 of horizontal drive motor 71 are compared in an operational amplifier 96, as shown in FIG. 4 and FIG. 10, to selectively drive two transistors 97 and 98. The output of operational amplifier 96 is connected to the bases of transistors 97 and 98. Transistor 97 is an NPN transistor having its collector connected to a voltage source +B and transistor 98 is a PNP transistor having its collector connected to a voltage source −B, and the emitters of the two transistors are connected in common to coil 63 and the non-inverting input of operational amplifier 96. The impedances of transistors 97 and 98 vary with the output from amplifier 96 to change the currrent flowing through drive coil 63, in the normal or reverse direction, whereby a drive force is generated in drive motor 71 to make the output of detecting coil 62 equal to zero. The rotation of tone arm 5 about horizontal drive shaft 7 is thus controlled by such drive force so that tone arm 5 is smoothly moved in the horizontal direction with high accuracy and without fluctuation thereof.

When tone arm 5 vibrates in the horizontal direction, a voltage corresponding to the level and direction of such vibration is generated in coil 62 so as to selectively turn transistors 97 and 98 ON and OFF. Accordingly, a current flows through coil 63 from voltage source +B to ground or from ground to voltage source −B whereby drive motor 71 is driven so as to impede such vibration of tone arm 5.

Figure 11A:
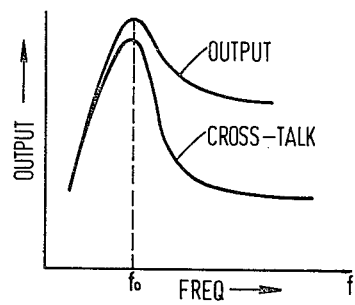
FIG. 11A is a graphical diagram of the transducer output versus frequency characteristic of a conventional tone arm, illustrating the output at the lower resonant frequency of the arm.

Thus, by means of the motional feedback control with respect to the horizontal rotation of tone arm 5, any horizontal vibration of tone arm 5 is diminished so as to reduce any cross-talk between the left and right stereo channels. As shown in FIG. 11A, when the motional feedback control is not used for the horizontal rotation of tone arm 5, the output of transducer 9 and any cross-talk between the left and right channel signals each peak at a lower resonant frequency $f_o$.

Figure 11B:
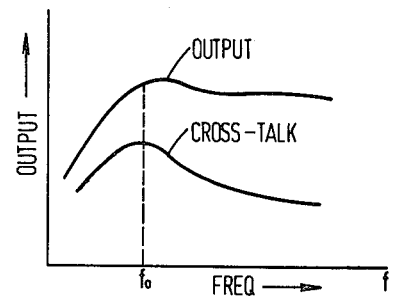
FIG. 11B is a graphical diagram of the transducer output versus frequency characteristic of the tone arm according to the embodiment of FIG. 1, illustrating the output at the lower resonant frequency of the arm.

However, according to the application of the motional feedback control in this invention, the output of transducer 9 and the cross-talk have a substantially flat characteristic at the lower resonant frequency $f_o$, as shown in FIG. 11B, so as to prevent undesirable reproduction. Further, the reproduced output from transducer 9 is not modulated due to the prevention of any vibration of tone arm 5.

Further, during reproduction, tone arm 5 is vibrated in the vertical direction as a result of warpage of the rotating disc or as a result of external vibration. A voltage corresponding to the direction and magnitude of such vertical vibration of tone arm 5 is generated in coil 56 of the vertical motion detector 47. As shown in FIG. 9, the voltage is applied to operational amplifier 91 to selectively turn ON and OFF transistors 92 and 93. Accordingly, a current flows through coil 49 of vertical drive motor 46 from voltage source +B to ground or from ground to voltage source −B whereby vertical drive motor 46 is driven so as to impede any undesirable vibration of tone arm 5. This means that tone arm 5 is always in contact with record disc 8 at a predetermined pressure so that the reproduced output always has high fidelity.

An operation for preventing linear movement of tone arm 5 during the reproduction operation, will now be discussed.

In particular, during or at the end of the reproduction operation, vertical drive motor 46 is activated by an instruction from an operating apparatus (not shown) whereby tone arm 5 is rotated about horizontal shaft 45 in the clockwise direction, as viewed in FIG. 3, to remove transducer 9 from the surface of disc 8 whereby to terminate the record playing or reproducing operation. The upward motion of tone arm 5 is detected by a pair of detecting members 99 and 100, shown in FIG. 3. For example, one detecting member 99 is constituted by a permanent magnet secured to the upper surface of carriage 14, and the other detecting member 100 is constituted by a Hall effect element secured to lower surface of casing 6 and in alignment with detecting member 99.

When the upward motion of tone arm 5 is detected by Hall effect element 100, an electronic switch 101 is turned OFF, while another electronic switch 102 is turned ON, as shown in FIGS. 8 and 12. This results in the output of an offset angle detector 103 being cut off from a position servo circuit 104, and the output of a position detector 105 being supplied to the position servo circuit 104. At this time, linear drive motor 28 generates a drive force to prevent free motion of tone arm 5. It should be appreciated that offset angle detector 103 is constituted by shutter 74, light-sensitive elements 76 and 77, and light-emitting element 78 and position detector 105 is constituted by slit plate 79, light-emitting element 86 and light-sensitive element 87, as shown in FIG. 8.

Linear tracking or tone arm 5, which is driven by linear drive motor 28, is freely moved along guide rails 18 and 19 when the record playing device is inclined with respect to the horizontal plane. For example, if the record playing device is supported by flexible support members, the device has a tendency to be inclined with movement of tone arm 5 as a result of the relatively large weight of tone arm 5 and carriage 14.

When tone arm 5 freely moves along guide rails 18 and 19, light-emitting element 86 and light-sensitive element 87 fixed on carriage 14 move relative to slit plate 79 (FIG. 2 and FIG. 7). As shown in FIG. 13A, slits 82 are formed at regular intervals in slit plate 79 so that light-sensitive element 87 produces an output, as shown in FIG. 13B, which is amplified by an operational amplifier 106 to produce a sinusoidal output (FIG. 13C) and then compared with a reference voltage derived from a variable resistor 107 (FIG. 8). In particular, the amplified sinusoidal output from operational amplifier 106 is supplied to the inverting input of operational amplifier 88 (FIG. 8) where it is added to the output from coil 38.

Figure 14:
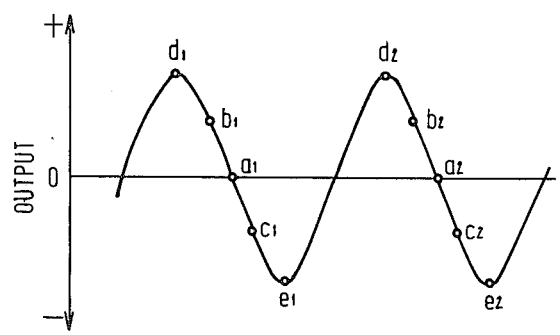
FIG. 14 is an enlarged waveform diagram of a portion of the waveform diagram of FIG. 13C.

As shown in FIG. 14, when the light-sensitive element 87 is perfectly aligned with a slit 82, the output of operational amplifier 106 is at a positive maximum value. When light-sensitive element 87 is shifted by one half of the pitch of slits 82 from the aforementioned slit 82, the output of operational amplifier 106 is at a negative maximum value. When light sensitive element 87 is shifted by ¼ of the pitch of slits 82 from the aforementioned slit 82, the output of operational amplifier 106 becomes zero. Such voltage is applied to the motional feedback circuit of linear drive motor 28, as shown in FIG. 8. The drive force of linear drive motor 28, corresponding to such voltage, is thus balanced with the weight of carriage 14 and its associated parts in the lengthwise direction of guide rails 18 and 19.

Figure 15A:
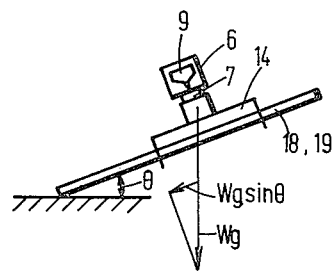
FIG. 15A is a schematic side plan view of a portion of the record playing device of FIG. 1 and which is used to explain the operation thereof when the record playing device is inclined upwardly to the right with respect to the horizontal plane.
Figure 15B:
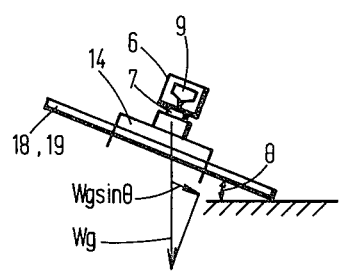
FIG. 15B is a schematic side plan view of a portion of the record playing device of FIG. 1 and which is used to explain the operation thereof when the record playing device is inclined upwardly to the left with respect to the horizontal plane.

When the record playing device is placed in a horizontal condition, tone arm 5 is balanced at points $a_1$, $a_2$ - - - $a_n$, shown in FIG. 14, since the component of the weight of carriage 14 and its associated parts, in the lengthwise direction of guide rails 18 and 19, is zero. When the record playing device is inclined upwardly to the right, as shown in FIG. 15A, tone arm 5 is balanced at points $b_1$, $b_2$ - - - $b_n$, where the drive force of linear drive motor 28 is balanced with the component Wg sin $\theta$ of the weight of carriage 14 and its associated parts in the lengthwise direction of the rails 18 and 19. When the record playing device is inclined upwardly to the left, as shown in FIG. 15B, tone arm 5 is balanced at points $c_1$, $c_2$ - - - $c_n$, where the drive force of linear drive motor 28 is balanced with the component Wg sin $\theta$ of the weight of carriage 14 and its associated parts in the lengthwise direction of the rails 18 and 19. It should thus be appreciated that tone arm 5 is always in a balanced condition within any one pitch of slits 82.

Figure 16:
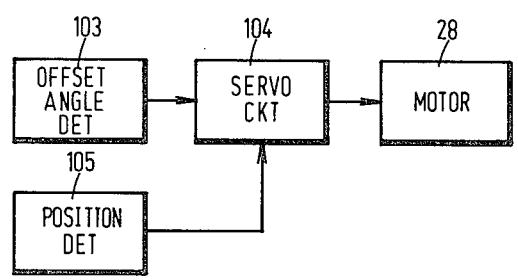
FIG. 16 is a block diagram of a modification of the circuit of FIG. 12 for preventing free motion of the tone arm.

Referring now to FIG. 16, there is shown therein a block diagram of one modification of the circuit of FIG. 12 for preventing free motion of tone arm 5. In the circuit, arm up-down detector 100 and electronic switches 101 and 102 are omitted. Thus, the circuit of FIG. 16 is of a simple construction in comparison with the circuit of FIG. 12. According to the circuit of FIG. 16, servo controls for cancelling the offset angle of tone arm 5 and for preventing free motion of tone arm 5 are effected at the same time. In this case, another force in addition to the force corresponding to the points $d_1$, $d_2$ - - - $d_n$, $e_1$, $e_2$ - - - $e_n$, is obtained from the servo system for cancelling the offset angle of tone arm 5 (FIG. 8). When the two servo controls are effected simultaneously, tone arm 5 is moved in a stepwise manner with each step corresponding to the pitch of slits 82. However, when the pitch of slits 82 is very small, for example, 100 $\mu$m, and the motional feedback control is effected, the stepwise movement of tone arm 5 practically is not feasible and has no influence on the reproduction of sound from the disc.

In the record playing device according to this invention, as above described, when tone arm 5 is lifted up from the record disc in the middle of play of the disc, tone arm 5 is prevented from freely moving along guide rails 18 and 19 so that tone arm 5 is stopped at its upper position. When the vertical drive motor 46 is again driven by an instruction from an operating member, tone arm 5 is lowered so that transducer 9 contacts the surface of the disc to again start the reproduction operation. With the advance of the record play, tone arm 5 moves toward the center of disc 8 along guide rails 18 and 19. When the transducer reaches the innermost groove of disc 8 so as to end the record play, as shown by the dotted lines in FIG. 1, a sensor (not shown) detects such condition to drive vertical drive motor 46 to lift tone arm 5 from the surface of the record disc, whereupon tone arm 5 is driven to its starting or rest position, shown by the dot-dash lines in FIG. 1, by linear drive motor 28. Tone arm 5 is held at such rest position for the start of the next record play.

Although a description has been omitted above, bias voltages for driving the motors 46 and 71 are cut off from operational amplifiers 91 and 96 during the disc play.

Having described specific preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. Apparatus for controlling a tone arm in a record playing device of the linear tracking pickup type, comprising:

guide means;

carriage means slidably mounted on said guide means;

a linear drive motor for linearly driving said carriage means along said guide means in the horizontal direction with respect to a record disc;

a pickup assembly mounted on said carriage means and including a supporting mechanism for supporting said tone arm for horizontal movement with respect to said record disc;

detecting means for detecting an inclination of said carriage means with respect to said record disc and for generating an output in response thereto; and means for supplying said output to said linear drive motor so as to stop the carriage means at a horizontal position with respect to said disc when said tone arm is lifted from said record disc.

2. The apparatus according to claim 1, further including a base member and wherein said detecting means includes light generating means mounted on said carriage means, light sensing means mounted on said carriage means in opposing relation to said light generating means, and plate means mounted on said base member and having at least one aperture adapted to be disposed between said light generating means and light sensing means.

3. The apparatus according to claim 1, wherein said detecting means includes means for generating a sinusoidal detected output in response to movement of said carriage means, and said means for supplying supplies said detected output to said linear drive motor.

4. The apparatus according to claim 1, wherein said linear drive motor includes a magnet member arranged in parallel with and along said guide means and a coil member mounted on said carriage means and disposed in the magnetic field of said magnet member.

5. The apparatus according to claim 4, further comprising linear velocity detecting means for detecting the linear velocity of said tone arm along said guide means, said velocity detecting means comprising a second magnetic member arranged in parallel with and along said guide means and a second coil member mounted on said carriage means and disposed in the magnetic field of said second magnet member for producing an output in response to movement of said carriage means, and means for supplying supplies said output from said second coil member to said linear drive motor to prevent undesirable linear horizontal movement of said tone arm.

6. Apparatus for controlling a tone arm in a record playing device of the linear tracking pickup type, comprising:

guide means;

carriage means slidably mounted on said guide means;

a linear drive motor for linearly driving said carriage means along said guide means in the horizontal direction with respect to a record disc;

a pickup assembly mounted on said carriage means and including a support mechanism for supporting said tone arm for horizontal movement with respect to said record disc;

vibration detecting means for detecting horizontal vibration in said tone arm and for generating an output in response thereto; and means for preventing said horizontal vibration in the tone arm in response to said output from said vibration detecting means.

7. The apparatus according to claim 6, wherein said vibration detecting means comprises a first magnet member and a first coil disposed in the magnetic field of said magnet member, one of said coil and magnet member being attached to said carriage means and the other being attached to said tone arm, and said means for preventing comprises a second magnetic member and a second coil disposed in the magnetic field of said second magnet member, one of said second coil and second magnet member being attached to said carriage means and the other being attached to said tone arm.

8. The apparatus according to claim 7, wherein both of said first and second coils are attached to said tone arm and both of said first and second magnet members are attached to said carriage means.

9. The apparatus according to claim 7, wherein said guide means includes at least two parallel guide rods and said vibration detecting means and said means for preventing are both disposed between said at least two parallel guide rods.

10. The apparatus according to claim 6, further comprising means for driving said tone arm in the vertical direction with respect to said disc, said means for driving including a vertical drive motor for moving said tone arm in the vertical direction with respect to said record disc, vertical velocity detecting means for detecting vertical vibration in said tone arm and for generating an output in response thereto, and means for supplying said output of said vertical velocity detecting means to said vertical drive motor to prevent said vertical vibration in said tone arm.

11. The apparatus according to claim 10, wherein said vertical drive motor comprises a magnet member and a coil disposed in the magnetic field of said magnet member, and said vertical velocity detecting means comprises a second magnet member and a second coil disposed in the magnetic field of said second magnet member, said coils of said vertical drive motor and said vertical velocity detecting means being attached to said carriage means, and said magnet members of said vertical drive motor and vertical velocity detecting means being attached to said tone arm.

12. The apparatus according to claim 6; further including inclination detecting means for detecting an inclination of said carriage means with respect to said record disc and for generating an output in response thereto, and means for supplying said output from said inclination detecting means to said linear drive motor to prevent undesirable linear movement of said carriage means with respect to said disc when said tone arm is lifted from said disc.

13. Apparatus for controlling a tone arm in a record playing device of the linear tracking pickup type, comprising:

guide means;

carriage means slidably mounted on said guide means;

a linear drive motor for linearly driving said carriage means along said guide means in the horizontal direction with respect to a record disc;

linear motor drive means for controlling the energization of said linear drive motor;

a pickup assembly mounted on said carriage means and including a supporting mechanism for supporting said tone arm for horizontal movement with respect to said record disc;

offset angle detecting means for detecting an offset angle of said tone arm and for generating an output in response thereto;

first means for supplying said output to said motor drive means when said tone arm traces said disc to drive said linear drive motor so as to compensate for said detected offset angle;

inclination detecting means for detecting an inclination of said carriage means with respect to said record disc and for generating an output in response thereto; and second means for supplying said output from said inclination detecting means to said motor drive means when said tone arm is lifted from said disc to prevent undesirable movement of said carriage means with respect to said disc.

14. The apparatus according to claim 13, wherein each of said first and second means include switch means, and said apparatus further includes an arm position detector for controlling the operation of each of said switch means and comprising a first member mounted on said carriage means and a second member mechanically coupled with said tone arm.

* * * * *